April 14, 1959 A. VASZIN 2,882,089
AMUSEMENT LOCOMOTIVE
Filed Oct. 1, 1956 2 Sheets-Sheet 1
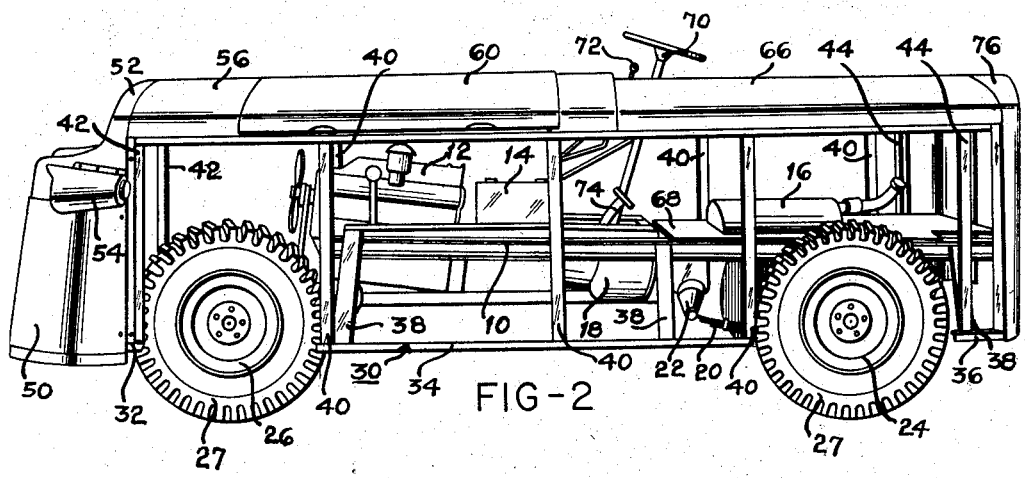
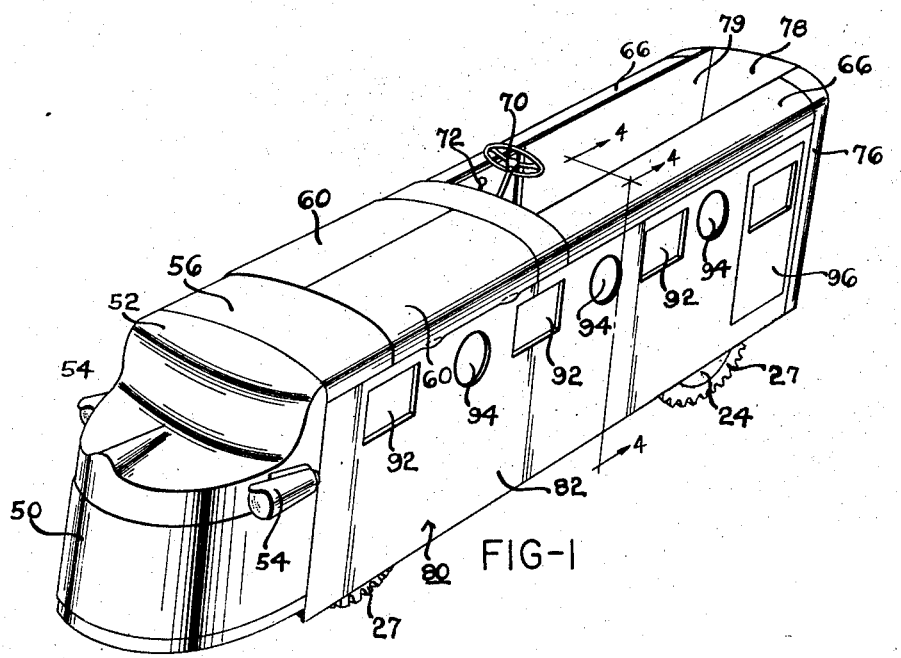
INVENTOR.
AUREL VASZIN
BY
ATTORNEYS

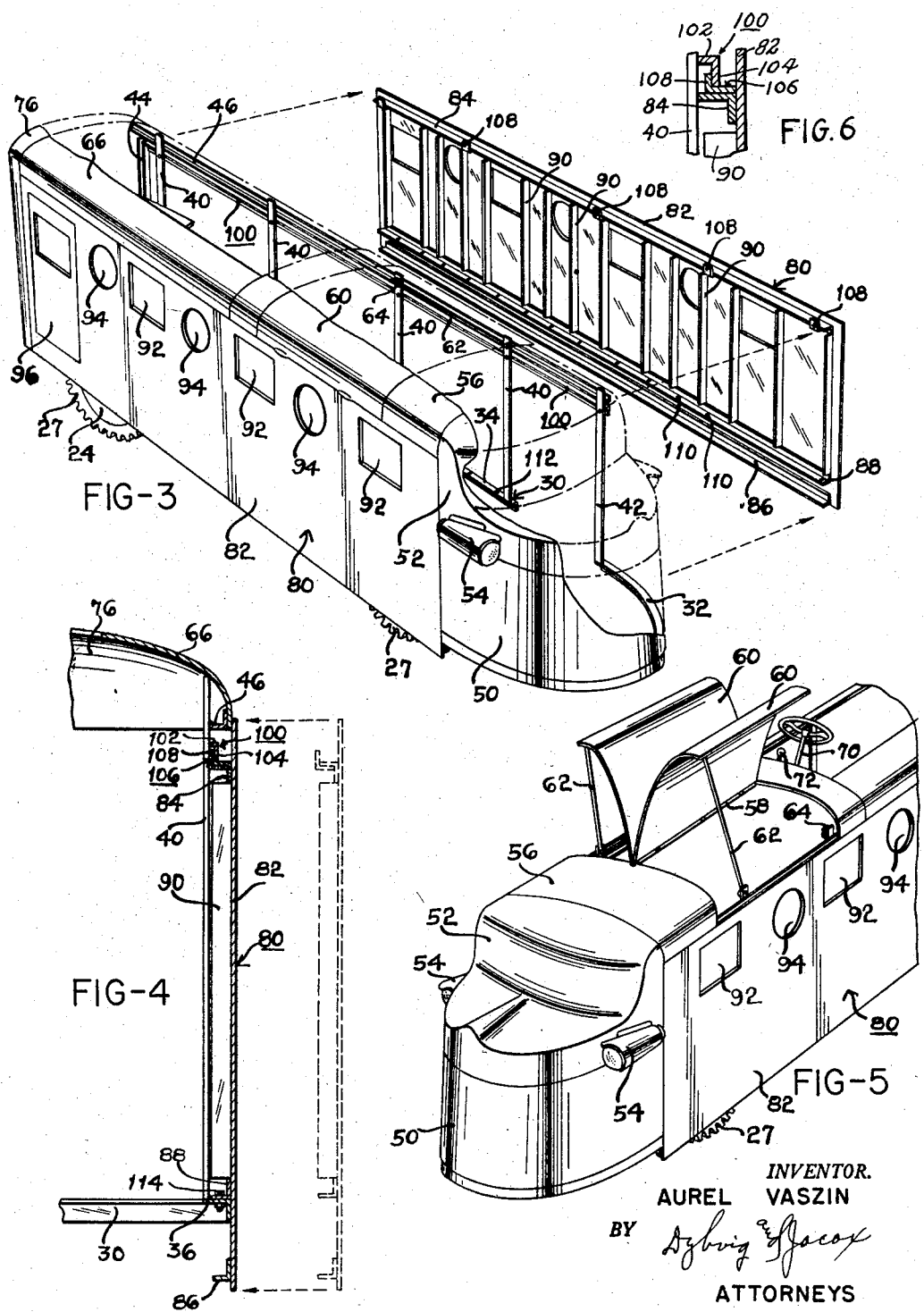

United States Patent Office 2,882,089
Patented Apr. 14, 1959

2,882,089
AMUSEMENT LOCOMOTIVE
Aurel Vaszin, Dayton, Ohio
Application October 1, 1956, Serial No. 613,255
4 Claims. (Cl. 296—28)

This invention relates to an amusement locomotive and more particularly to an automotive vehicle wherein the chassis is provided with a body portion simulating a diesel locomotive, although not necessarily so limited.

An object of this invention is to provide a steerable automotive vehicle simulating a diesel locomotive wherein the body portion of the vehicle is provided with detachable side panels enabling access to the chassis of the vehicle without removal of the entire body portion of the vehicle.

Another object of this invention is to provide an automotive vehicle simulating a diesel locomotive wherein the body portion of the vehicle has suitable openings therein permitting removal of the wheels of the chassis.

Other objects and advantages reside in the construction of parts, the combination thereof, the method of manufacture, and the mode of operation, as will become more apparent from the following description.

In the drawings,

Figure 1 is a perspective view of the automotive vehicle of this invention.

Figure 2 is a side elevational view of the vehicle with side panels removed.

Figure 3 is a partially exploded perspective view, with portions broken away, showing the body portion of the vehicle.

Figure 4 is an enlarged, fragmentary, sectional view taken substantially along the line 4—4 of Figure 1, the view showing one of the side panels detached from the body portion in broken line detail.

Figure 5 is a fragmentary, perspective view of the vehicle illustrating hingedly mounted panels at the top of the vehicle opened for access to the chassis.

Figure 6 is an enlarged, fragmentary sectional view illustrating, in detail, a hook mechanism for securing the side panels to the body portion of the vehicle.

Referring to the drawings in detail, the chassis for the vehicle illustrated in Figure 2 is constructed upon a frame 10. As in conventional automobiles, the frame 10 supports an engine 12, a battery 14, a fuel tank 16, a transmission 18, and other components necessary to the propulsion of the vehicle. Leaf springs 20 secured to the frame 10 by suitable brackets 22 support the frame 10 upon a rear axle, not shown, upon which rear wheels 24 are mounted. The forward part of the frame 10 rests upon a front wheel suspension mechanism, not shown, including front wheels 26. In the particular device shown herein a four wheel drive is employed.

As clearly illustrated in Figure 1, the front wheels 26 are spaced apart a lesser distance than the rear wheels 24. This construction provides for steering movement of the front wheels when a body portion is assembled upon the chassis. The wheels 24 and 26 resemble conventional automobile wheels and are provided with tires 27, as illustrated in the drawings.

The body portion of the vehicle, as illustrated in Figure 3, comprises a skeletonal substructure and a plurality of sheet metal panels. The substructure has a substantially U-shaped base formed by angle bars, the base including an arcuate or rounded forward angle bar member 32, parallel side members 34, and parallel rear members 36 supported in spaced relation by a cross-bar 30 shown in Figure 4. The members 32, 34, and 36 are individually secured to the frame 10 by arms 38. Preferably, the arms 38, frame 10, and the angle bars 32, 34, and 36 are welded together, however, other fastening means may be employed. In the following, the chassis and body portion will be deemed to occupy horizontal planes.

The side members 34 each support a plurality of upright spaced studs 40 formed from metal bars. Similarly, the forward member 32 and the rear members 34 of the base support upright studs 42 and 44 respectively. The upright studs 40, 42, and 44 are aligned on either side of the chassis and cooperate to support angle bars 46 in spaced parallel relation to the side members 32, there being one angle bar 46 on each side of the chassis. Suitable cross bars, not shown, extend between the two angle bars 46, so as to maintain the sides of the skeletonal substructure in fixed spaced relation.

A sheet metal cowling contoured to simulate the front end of a diesel locomotive is secured to the forward portion of the substructure. The cowling comprises two panels, a substantially semi-cylindrical lower panel 50 mated with and engaging the arcuate forward member 32 of the base and also engaging the upright studs 42, and a contoured upper panel 52 mated with and secured to the lower panel 50 and engaging the upright studs 42. The panel 52 carries headlights 54 as illustrated in the drawings.

The vehicle is covered with a plurality of arcuate top panels, there being one apertured panel 56 extending across the top of the substructure between the angle bars 46 from the front cowling substantially half the distance to the rear of the substructure. The top panel 56 supports a hinge member 58 upon which are mounted panels 60 for covering the opening in the panel 56. As shown in Figure 5, the panels 60 may be pivoted upwardly for access to the chassis. The panels 60 simulate the hoods of motor vehicles. Suitable rods 62, there being one pivotally attached to an upright stud 40 on each side of the substructure, are provided for supporting the panels 60 in the open position. Clips 64 attached to an adjacent stud 40 support the rods 62 when the panels 60 are lowered to cover the aperture in the panel 56.

The covering for the vehicle is completed with a pair of spaced elongate panels 66, there being one panel 66 secured to each angle bar 46 and engaging the rear of the panel 56. The space between the panels 66 provides a walk-in space for a driver for the vehicle, there being a suitable platform 68 secured to the frame 10 upon which the driver may stand.

Suitable controls for operating the vehicle project into the walk-in space. These controls include the conventional steering column 70, a gear shift 72, and a brake 74. A cowling 76, seen best in Figure 1, is attached to the rear of the substructure where it engages the upright studs 44 and the member 30 of the substructure. The cowling 76 has a hingedly mounted door panel 78 therein providing access to the walk-in space. Suitable panels 79 enclose the sides of the walk-in space.

The vehicle simulating a diesel locomotive is completed by attaching suitable side panels 80 to the sides of the skeletonal substructure. One of the chief disadvantages encountered in earlier amusement devices of the type herein described is that the amusement device, fully enclosed by a body portion provided with relatively small access panels is difficult to repair. Major repair on the chassis can ordinarily be accomplished only by removing entirely the body portion of the vehicle. The body portion is very heavy, weighing up to a ton in larger vehicles. That being the case, considerable apparatus and effort is required to move the body portion. In the present device, the necessity for removing the body portion of the vehicle is substantially eliminated by providing removable side panels, such that one entire side, or both sides, of the chassis may be exposed for repair, leaving the remainder of the body portion intact on the chassis. These side panels 80 are sufficiently light in weight that, depending on the material used in constructing the panels, one or two men may remove the panel.

The side panels 80 each comprise a rectangular layer of sheet metal 82 reinforced with a suitable framework. The framework is provided with spaced upper and lower horizontal angle bars 84 and 86 and an intermediate horizontal angle bar 88 adjacent the lower angle bar 86. A plurality of spaced vertical studs 90 interconnect the angle bars 84 and 88.

A plurality of rectangular and circular port holes 92 and 94 cut into each side panel 80 give the appearance of the side paneling of a diesel locomotive. As shown in Figures 1 and 3, a rectangular panel 96 is inserted in a suitable aperture in each side panel 80 to simulate a door.

The side panels 80 are attached to the skeletonal substructure of the vehicle in the following manner. An angle bar 100 is secured to each side of the skeletonal substructure in parallel spaced relation to the angle bars 46. As clearly shown in Figure 6, the angle bar 100 has one flange 102 secured to and directed normal to the studs 40 and another flange 104 projecting downwardly from the flange 102 in spaced parallel relation to the studs 40. The flanges 104 on either side of the vehicle engage angular hook members 106 secured to the angle bars 84 of the side panels 80, the hook members 106 each having an upwardly directed portion 108 adapted to seat between the studs 40 and the adjacent flange 104.

In securing each side panel 80 to the substructure, the hook members 106 are first seated in the angle bar 100 with the lower portion of the side panel projecting angularly downwardly and away from the side of the vehicle. The side panel is then pivoted to a vertical position against the side of the substructure such that the angle bar 90 of the side panel engages and seats upon the side member 34 of the substructure, as shown in Figure 4. As the side panels 80 are pivoted in this manner into place on the sides of the vehicle, apertures 110 and 112 in the angle bars 90 and in the side members 34, respectively, are brought into alignment such that bolts 114, or other suitable fastening means, may be projected through the aligned apertures to fasten the side panel 80 to the substructure. The bars 90 and the side members 34 cooperate to provide a rigid frame structure.

As clearly shown in Figures 1 and 5, the side panels 80 fully enclose the sides of the vehicle, the wheels 24 and 26 being disposed between the side panels 80. Repair and replacement of tires is accomplished by removing the side panels 80. As clearly shown in Figure 2, the members 32, 34 and 36 of the base of the substructure are spaced apart to permit removal of the wheels 24 and 26.

Inasmuch as the front wheels 26 are disposed between the parallel side panels 80, it is essential that there be adequate space between the wheels 26 and the panels 80 to permit the wheels 26 to be turned in steering. The necessary clearance is provided by spacing the front wheels closer together than the rear wheels 24 as described hereinbefore.

The body portion of the vehicle may be constructed of steel, aluminum alloy, or fiberglass, or any other material suitable to the construction of conventional automobile bodies. The panels comprising the body surface may be riveted to the substructure or secured in any other suitable manner.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. An automotive vehicle comprising, in combination, an automotive chassis including a frame, a body portion, and means secured to the frame for supporting the body portion, said body portion comprising a skeletonal substructure including a horizontally disposed base partially surrounding said chassis, a plurality of spaced upright studs projecting upwardly from said base forming the sides of said vehicle, a first pair of horizontally disposed angle bars, there being one angle bar supported by the spaced studs on each side of said substructure in spaced parallel relation to the base of said substructure, and a second pair of horizontally disposed angle bars, there being one angle bar of said second pair secured to the spaced studs on each side of said substructure in spaced parallel relation to the angle bars comprising said first pair, each angle bar of said second pair providing a downwardly directed flange portion extending horizontally the length of said substructure, a pair of side panels, there being one side panel attachable to each side of said substructure, hook means secured to the upper portion of each said side panel and adapted to engage one of the angle bars of said second pair whereby each said side panel is engageable with said substructure, a third pair of angle bars, there being one angle bar secured to the lower portion of each said side panel adapted to engage and seat upon the base portion of said substructure, and removable fastening means for securing the angle bars of the third pair to the base of said substructure whereby said side panels are fastened to said substructure.

2. An automotive vehicle comprising, in combination, an automotive chassis including a frame, a body portion, and means secured to the frame for supporting the body portion, said body portion comprising a skeletonal substructure including a horizontally disposed base partially surrounding said chassis, a plurality of spaced upright studs projecting upwardly from said base forming the sides of said vehicle, a first pair of horizontally disposed angle bars, there being one angle bar supported by the spaced studs on each side of said substructure in spaced parallel relation to the base of said substructure, and a second pair of horizontally disposed angle bars, there being one angle bar of said second pair secured to the spaced studs on each side of said substructure in spaced parallel relation to the angle bars comprising said first pair, each angle bar of said second pair providing a downwardly directed flange portion extending horizontally the length of said substructure, a pair of side panels, there being one side panel attachable to each side of said substructure, hook means secured to the upper portion of each said side panel and adapted to engage one of the angle bars of said second pair whereby each said side panel is engageable with said substructure, and means for fastening the lower portions of said side panels to the base of said substructure.

3. An automotive vehicle comprising, in combination, an automotive chassis including a frame, and a body portion mounted upon the frame, said body portion having an opening in one side thereof, a panel, and hook means for detachably securing the panel in covering relation to the opening, said hook means including a member secured to the body portion providing a downwardly directed flange in the upper portion of said opening, a hook secured on the inner side of said panel adapted to project under and behind said downwardly directed flange when said panel is in covering relation to said opening, and means for detachably securing the lower portion of the panel fixedly to the vehicle.

4. An automotive vehicle comprising, in combination, an automotive chassis including a frame, and a body portion mounted upon the frame, said body portion having an opening in one side thereof, a panel, and hook means for detachably securing the panel in covering relation to the opening, said hook means including a horizontally disposed member secured to the body portion providing a downwardly directed flange extending horizontally across the upper portion of said opening, a plurality of hooks secured on the inner side of said panel adapted to project under and behind said downwardly directed flange when said panel is in covering relation to said opening, and means for detachably securing the lower portion of the panel fixedly to the vehicle.

References Cited in the file of this patent

UNITED STATES PATENTS

| | | |
|---|---|---|
| 1,343,519 | Motte | June 15, 1920 |
| 2,029,756 | Davis | Feb. 4, 1936 |
| 2,051,075 | Burrows et al. | Aug. 18, 1936 |
| 2,157,793 | Lang | May 9, 1939 |
| 2,222,619 | Jandus | Nov. 26, 1940 |
| 2,407,007 | Henrichsen | Sept. 3, 1946 |
| 2,612,964 | Hobbs | Oct. 7, 1952 |